US009405897B1

(12) United States Patent
Bailey et al.

(10) Patent No.: US 9,405,897 B1
(45) Date of Patent: Aug. 2, 2016

(54) AUTHENTICATING AN ENTITY

(75) Inventors: Daniel V. Bailey, Pepperell, MA (US); Lawrence N. Friedman, Arlington, MA (US); Yedidya Dotan, Tel Aviv (IL); Samuel Curry, North Andover, MA (US)

(73) Assignee: EMC Corporation, Hopkinton, WA (US)

( * ) Notice: Subject to any disclaimer, the term of this patent is extended or adjusted under 35 U.S.C. 154(b) by 0 days.

(21) Appl. No.: 13/538,640

(22) Filed: Jun. 29, 2012

Related U.S. Application Data

(63) Continuation-in-part of application No. 13/435,951, filed on Mar. 30, 2012.

(51) Int. Cl.
*G06F 21/31* (2013.01)
*G06F 21/44* (2013.01)
*H04L 9/32* (2006.01)
*G06F 21/55* (2013.01)

(52) U.S. Cl.
CPC .............. *G06F 21/44* (2013.01); *G06F 21/316* (2013.01); *G06F 21/552* (2013.01); *H04L 9/3271* (2013.01); *H04L 9/3297* (2013.01); *G06F 2221/2111* (2013.01); *G06F 2221/2151* (2013.01); *H04L 2209/80* (2013.01)

(58) Field of Classification Search
None
See application file for complete search history.

(56) References Cited

U.S. PATENT DOCUMENTS

| 8,255,971 | B1 * | 8/2012 | Webb et al. ....................... 726/1 |
| 8,683,597 | B1 * | 3/2014 | Johansson et al. ............... 726/25 |
| 2006/0282660 | A1 * | 12/2006 | Varghese et al. ............... 713/155 |
| 2008/0033637 | A1 * | 2/2008 | Kuhlman et al. ............. 701/202 |
| 2010/0175116 | A1 * | 7/2010 | Gum ................................. 726/6 |
| 2010/0211997 | A1 * | 8/2010 | McGeehan et al. ............... 726/4 |
| 2011/0016534 | A1 * | 1/2011 | Jakobsson et al. ............... 726/28 |
| 2011/0081634 | A1 * | 4/2011 | Kurata et al. .................. 434/236 |

\* cited by examiner

*Primary Examiner* — David Pearson
(74) *Attorney, Agent, or Firm* — Krishnendu Gupta; Jason A. Reyes

(57) ABSTRACT

There is disclosed a method and system for use in authenticating an entity. An entity location history is stored comprising a historical record of locations visited by the entity. An authentication request is received from the entity. A pattern of recent locations visited by the entity indicative of irregular behavior is detected. An analysis is performed between the pattern of recent locations indicative of irregular behavior and the entity location history for establishing the riskiness of the authentication request. An authentication result is generated based on the analysis between the pattern of recent locations indicative of irregular behavior and the entity location history.

10 Claims, 5 Drawing Sheets

AUTHENTICATING AN ENTITY

RELATED APPLICATION

This application is a continuation-in-part application claiming priority to co-pending U.S. patent application Ser. No. 13/435,951, filed Mar. 30, 2012, reference no. EMC-12-028, entitled "AUTHENTICATING AN ENTITY IN CONNECTION WITH A COMPUTERIZED RESOURCE", the entirety of which patent application is hereby incorporated by reference herein.

TECHNICAL FIELD

The present invention relates to authenticating an entity.

BACKGROUND OF THE INVENTION

Generally, security systems employ an identity-based authentication scheme to verify the identity of an entity before granting access to a computer system or a computerized resource. One goal of such security systems is to accurately determine identity so that an unauthorized party cannot gain access. Security systems can use one or more of several factors, alone or in combination, to authenticate entities. For example, security systems can be based on something that the entity knows, something the entity is or something that the entity has.

Examples of something an entity knows are a code word, password, personal identification number ("PIN") and the like. Examples of something the entity is include a distinct characteristic or attribute known as a biometric. An example of something an entity possesses is a physical or digital object, referred to generally as a token, that is unique, or relatively unique, to the user.

However, it will be appreciated that the threat in connection with security systems is increasing. For example, a password or token may easily be compromised. Indeed, even though it is a little more difficult, it is possible to fraudulently create a copy of a biometric. For example, a user's voice may be recorded and later used to initiate authentication. Therefore, there is a need for further security measures when verifying the identity of an entity before granting access to a computer system or a computerized resource.

SUMMARY OF THE INVENTION

There is disclosed a method and system for use in authenticating an entity. An entity location history is stored comprising a historical record of locations visited by the entity. An authentication request is received from the entity. A pattern of recent locations visited by the entity indicative of irregular behavior is detected. An analysis is performed between the pattern of recent locations indicative of irregular behavior and the entity location history for establishing the riskiness of the authentication request. An authentication result is generated based on the analysis between the pattern of recent locations indicative of irregular behavior and the entity location history.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

The invention can be implemented in numerous ways, including as a process, an apparatus, a system, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
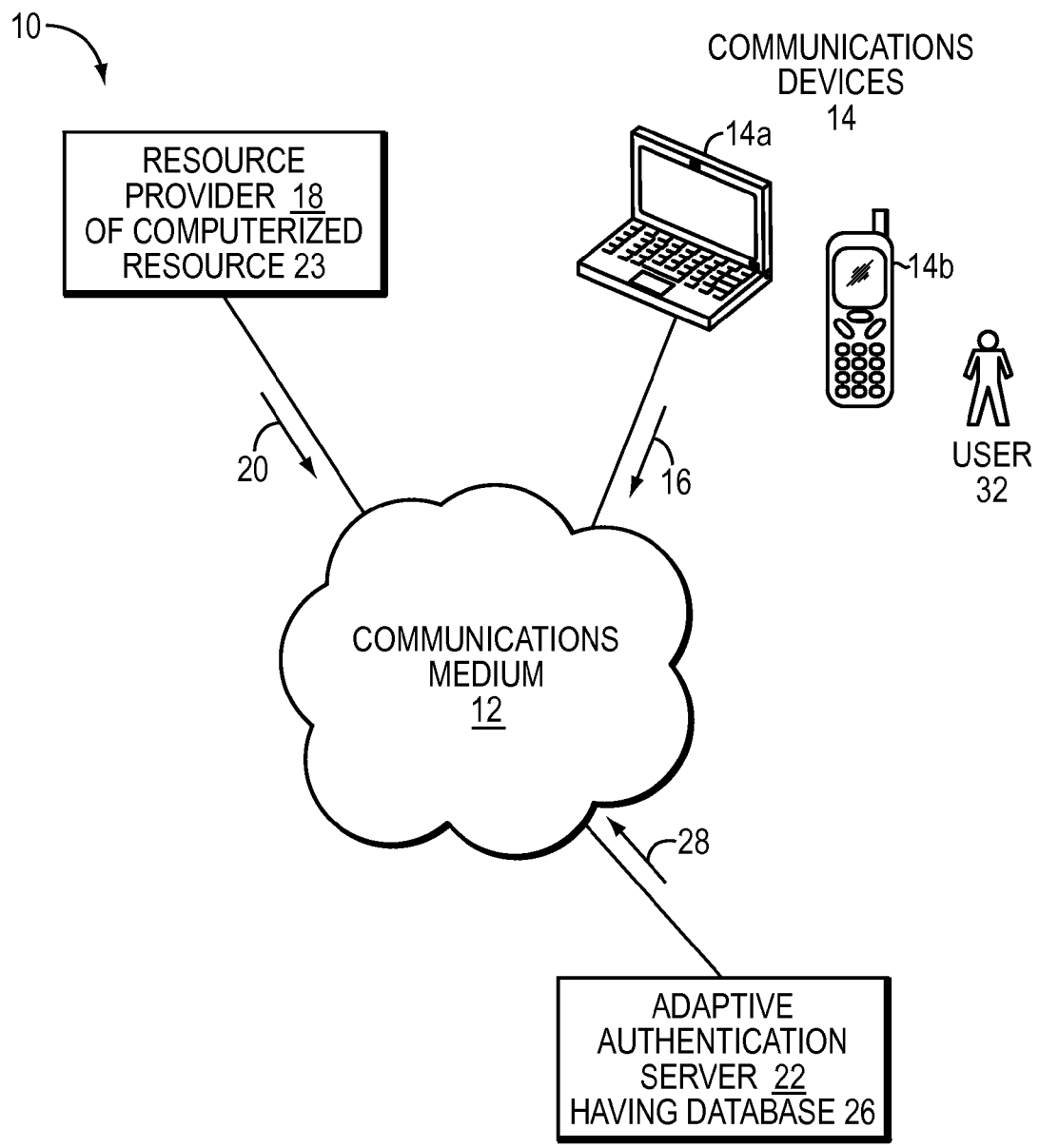
FIG. 1 is a diagram illustrating an example environment for implementing the technique as described herein.

Referring to FIG. 1, there is illustrated an example environment 10 for implementing the technique of authenticating an entity as described herein. It will be understood that in this embodiment the entity is a human user. The environment 10 comprises a plurality of communications devices 14, a communications medium 12, a resource provider 18 and an adaptive authentication server 22.

The communications devices 14 can be smartphones, personal digital assistants, laptop computers, desktop computers, tablet computers, cameras, MP3 players, portable game systems, and the like constructed and arranged to submit an authentication request 16 to the resource provider 18 via the communications medium 12 which then delegates the authentication task to the adaptive authentication server 22. However, it will be appreciated that in some embodiments the authentication request 16 may be sent direct to the adaptive authentication server 22 over the communications medium 12 rather than indirectly through the resource provider 18. It will also be appreciated that the authentication request may comprise a username or user identifier in order to facilitate identification of the user.

In this embodiment, a user 32 comprises a laptop computer 14a and a mobile wireless communications device such as a smartphone 14b with GPS capability or other location determining capability. It will be understood that the laptop computer 14a and the smartphone 14b may facilitate access to the resource provider 18 via the communications medium 12. The smartphone 14b may also have other functionality as will be known in the art.

The communications medium 12 provides network connections between the communications devices 14, the resource provider 18 and the adaptive authentication server 22. The communications medium 12 can implement a variety of protocols such as TCP/IP, UDP, ATM, Ethernet, Fibre Channel, combinations thereof, and the like. Furthermore, the communications medium 12 can include various components (e.g., cables, switches/routers, gateways/bridges, NAS/SAN appliances/nodes, interfaces, etc.). Moreover, the communications medium 12 is capable of having a variety of topologies (e.g., queue manager-and-spoke, ring, backbone, multi drop, point to-point, irregular, combinations thereof, and so on).

The resource provider 18 can provide the user 32 of the communications devices 14 with access to one or more computerized resources 23 following successful user authentication. An example of a suitable resource provider 18 is a data storage array which provides secure access to files, directories, volumes, LUNs, etc. Another example of a suitable resource provider 18 is a web server which provides secure access to various web pages. Yet another example of a suitable resource provider 18 is a server which provides secure user account and/or transactional access such as that for an online banking site, an online store, an online gaming site, and so on. Other types of resource providers are suitable for use as well.

The adaptive authentication server 22 as will be described in further detail below is configured to receive an authentication request 20 from the resource provider 18 over the communications medium 12. The adaptive authentication server 22 may also in other embodiments receive an authentication request direct from the communications devices 14. In either embodiment, the authentication request is sent to the adaptive authentication server 22 in order to authenticate the identity of the user 32 by performing risk-based authentication.

The adaptive authentication server 22 as will be described further below includes a location history database 26 for storing a location history in connection with the user 32. In this embodiment, the location history of the user 32 will be assumed to emulate the location of at least one of the communications devices 14 such as the smartphone 14b. It will be appreciated that generally the smartphone 14b can be assumed to be located at substantially the same location as the user 32. For example, the majority of users 32 will have the smartphone 14 located substantially adjacent throughout the day. Therefore, it is assumed that the location of the user 32 and the smartphone 14b are substantially similar over a period of time.

The adaptive authentication server 22 is further configured for performing risk-based assessment by initially detecting a pattern of recent locations indicative of irregular behavior in connection with user 32. The recent locations can be determined by the GPS in the smartphone 14b and periodically forwarded to the server 22 such that machine learning or data mining techniques associated with the server 22 can detect a pattern indicative of irregular behavior. The server 22 can subsequently perform an analysis between the pattern and the location history in order to establish the riskiness of the authentication request. Based on the analysis, the adaptive authentication server 22 is configured to send an adaptive authentication result 28 to the resource provider 18 via the communications medium 12 on completion of the risk based authentication in the server 22 in order to grant or deny authentication to the computerized resource 23.

Figure 2:
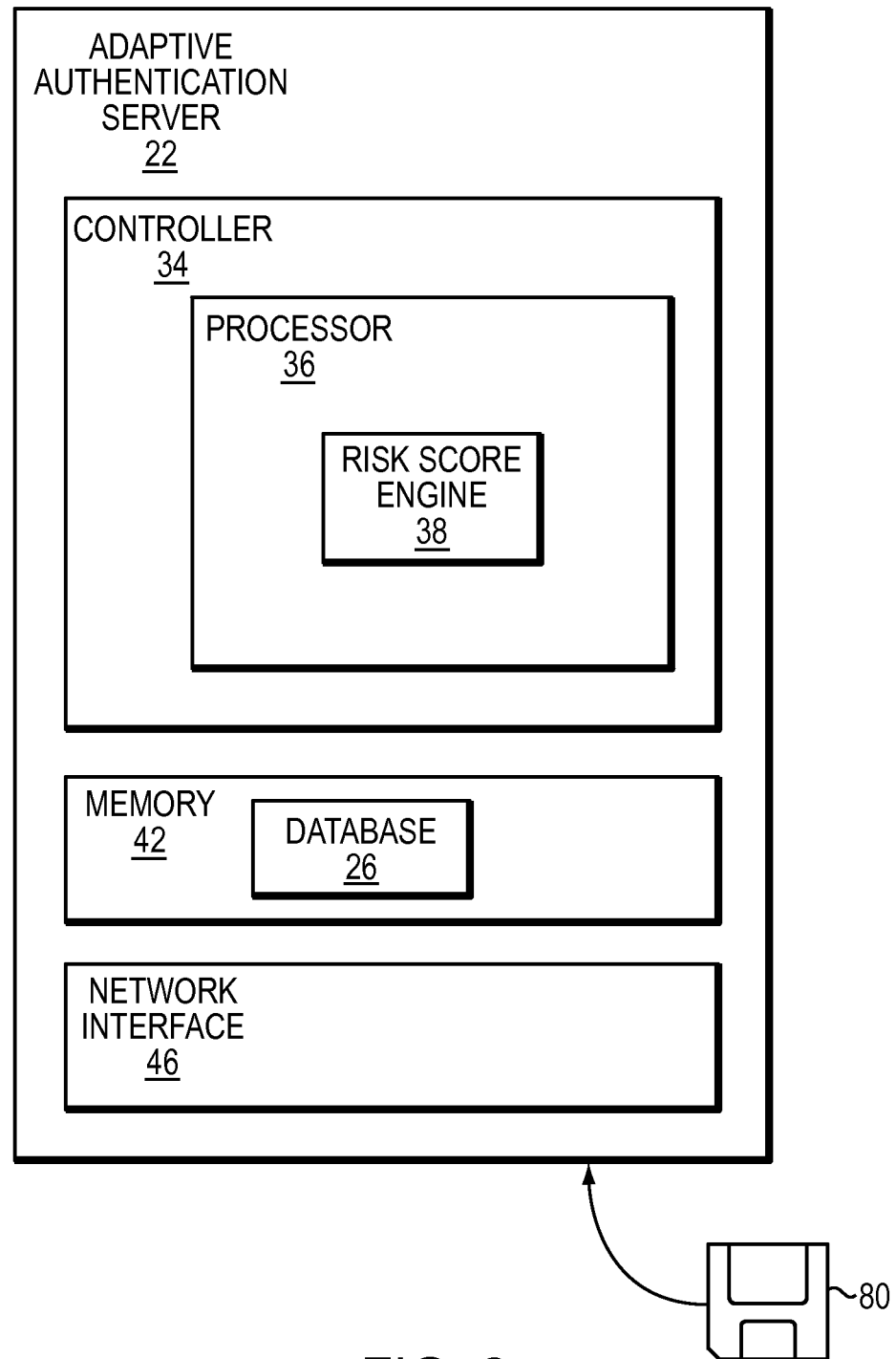
FIG. 2 is a diagram illustrating an example adaptive authentication server within the environment illustrated in FIG. 1.

Referring to FIG. 2, there is illustrated the components of the adaptive authentication server 22. The adaptive authentication server 22 comprising a network interface 46, a memory 42 and a controller 34.

The network interface 46 is constructed and arranged to send and receive data over the communications medium 12. Specifically, in this embodiment, the network interface 46 is configured to receive authentication request 20 from resource provider 18 over communications medium 12 and to send authentication result 28 to the resource provider 18 over communications medium 12.

The memory 42 is configured to store the location history database 26 which includes a record of discrete locations visited by the user 32 over a period of time. It will be appreciated that a system administrator may complete an enrollment process for the user 32 in order to store the historical location data in the database 26 of the adaptive authentication server 22. For example, the user 32 may collect location data over a period of time using the GPS in the smartphone 14b. This historical location data may be submitted to the database in the server 22 for creating a location history for the user 32. It will be appreciated from the above description that in this embodiment the location of the smartphone 14b is assumed to emulate the location of the user 32 such that the location history of the smartphone 14b is also the location history of the user 32.

It will also be understood that the database 26 can be configured for storing multiple data entries with each data entry including a user identifier, a location and a timestamp. For example, the database 26 can comprise data entries associating the user 32, the geolocation co-ordinates of the user 32 and the time at which the user 32 visited the geolocation co-ordinates. It will be further appreciated that the database may comprise multiple entries which may be updated periodically. The memory 42 generally takes the form of, e.g., random access memory, flash memory or a non-volatile memory.

It will be still further understood that the recent locations of the user 32 as periodically submitted to the server 22 by the smartphone 14b may also be stored in the database. This enables machine learning or data mining techniques associated with the server to detect an irregular or unusual or suspicious pattern.

The controller 34 includes a processor 36 which takes the form of, but is not limited to, Intel or AMD-based MPUs, and can include a single or multi-cores each running single or multiple threads. The processor 36 is coupled to memory 42 and includes a risk score engine 38 constructed and arranged to assign a risk score to an authentication request based on the location history of the user 32 in the database 26 and the pattern of recent locations visited by the user indicative of irregular behavior.

At this point, it should be understood that the controller 34 of the authentication server 22 is capable of being implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product is capable of delivering all or portions of the software. The computer program product 80 has a non-transitory (or non-volatile) computer readable medium which stores a set of instructions which controls one or more controller operations. Examples of suitable computer readable storage media include tangible articles of manufacture and apparatus which store instructions in a non-volatile manner such as CD-ROM, flash memory, disk memory, tape memory, and the like.

Figure 3:
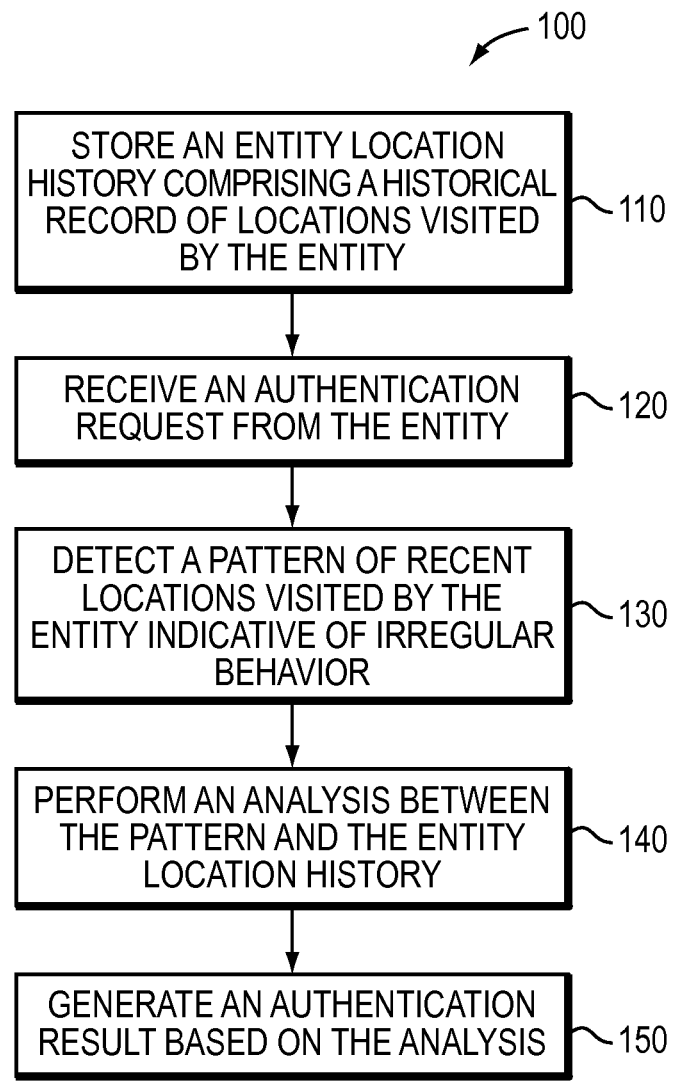
FIG. 3 is a flowchart summarizing the steps of a technique for use in authenticating an entity.

Referring to FIG. 3, there is illustrated a technique 100 for use in authenticating an entity in an environment 10 substantially similar to that as described above. For example, it will be appreciated that in this embodiment the technique is used for authenticating a user 32 in connection with a computerized resource 23.

The technique comprises storing 110 a location history comprising a historical record of locations visited by the user 32. It will be understood from the above description with respect to previous figures that the smartphone 14b associated with the user 32 is assumed to visit discrete locations over a period of time emulating the user's movement. In this embodiment, the GPS capability in the smartphone 14b can determine the historical locations visited by the user 32 over a period of time. The phone can subsequently forward at least one input signal comprising the historical locations of the user 32 to the server 22 such that the historical locations can be derived therefrom by the processor 36 and stored in the location history in the database 26 in memory 42.

The technique comprises receiving 120 an authentication request from the user 32. For example, the user 32 may send an authentication request 16 using one of the communications devices 14 for access to the resource provider 18 of computerized resource 23. The authentication request 16 will be sent to the resource provider 18 over the communications medium 12 before the resource provider 18 sends an authentication request 20 to the authentication server 22. It will be understood that the authentication request 20 can be received in the authentication server 22 by the network interface 46.

The technique comprises detecting 130 a pattern of recent locations visited by the user 32 indicative of irregular behavior. For example, the adaptive authentication server 22 can receive one or more input signals from the smartphone 14b associated with the user 32 comprising the recent locations visited by the user 32. It will be appreciated that the one or more input signals can be received in the adaptive authentication server 22 over the communications network 12 by the network interface 46. For example, the authentication server 22 may receive the one or more input signals periodically from the smartphone 14b. The adaptive authentication server 22 can derive from the one or more input signals the recent locations of the user 32. For example, the processor 36 is configured for deriving the recent locations from the received input signal. The server 22 can store the recent locations in the database 26 in memory 42. This enables the server 22 using data mining or machine learning techniques to detect a pattern indicative of irregular behavior.

The technique comprises performing 140 an analysis between the pattern of recent locations visited by the user 32 indicative of irregular behavior and the location history in connection with the user for establishing the riskiness of the authentication request. For example, the processor 36 can perform an analysis between the pattern of recent locations and the location history. This will be described in further detail below.

The technique comprises generating 150 an authentication result based on the analysis between the pattern of recent locations visited by the user indicative of irregular behavior and the location history in connection with the user 32. It will be appreciated that the authentication result can be used for authenticating the user. The generation of the authentication result comprises outputting, as an authentication signal, a risk score based on at least one risk factor. It will be appreciated that in this embodiment the result of the analysis between the pattern of recent locations visited by the user indicative of irregular behavior and the location history is one factor. The risk score may form part of the adaptive authentication result 28 sent to the resource provider 18 via the communications medium 12. In one embodiment, the risk score enables granting of access to the computerized resource in response to the risk score exceeding a predefined threshold and denying access to the computerized resource in response to the risk score not exceeding the predefined threshold.

It will be understood that the recent locations by themselves may not be considered risky as the locations may be substantially similar to the location history for the user 32. It will be appreciated that in such a scenario an analysis between the recent locations and the location history may not indicate anything unusual. However, the sequence of the recent locations and the timeline can suggest an irregular behavior pattern. The above technique is advantageous in that it performs an analysis between the location history and the pattern of recent locations indicative of irregular behavior for establishing the riskiness of the authentication request. For example, if the recent locations of the smartphone 14b are in the exact same location for a prolonged period of time this could be detected as being an irregular pattern. By virtue of detecting such a pattern, it will be understood that the riskiness of the authentication request is likely to be extremely high if the location history indicates that the user 32 has historically a regular travel pattern in which the user is not typically located in the one location. In another example, if the smartphone 14b is inadvertently left in a taxi it is likely that the smartphone 14b will travel aimlessly for a period of time. If a third party attempts to access the computerized resource 23 having found the phone it is likely that an analysis between the location history and the pattern of irregular recent locations will establish a high risk. However, it will be appreciated that if the location history as stored in the database 26 is for a taxi driver the analysis is likely to indicate little risk as the location history will most likely indicate a similar aimless historical pattern. It will be appreciated by those skilled in the art that a data mining or a machine learning technique can detect such irregular patterns from the historical location data in the database 26. These techniques are extremely effective at locating correlations in large sets of data.

Figure 4:
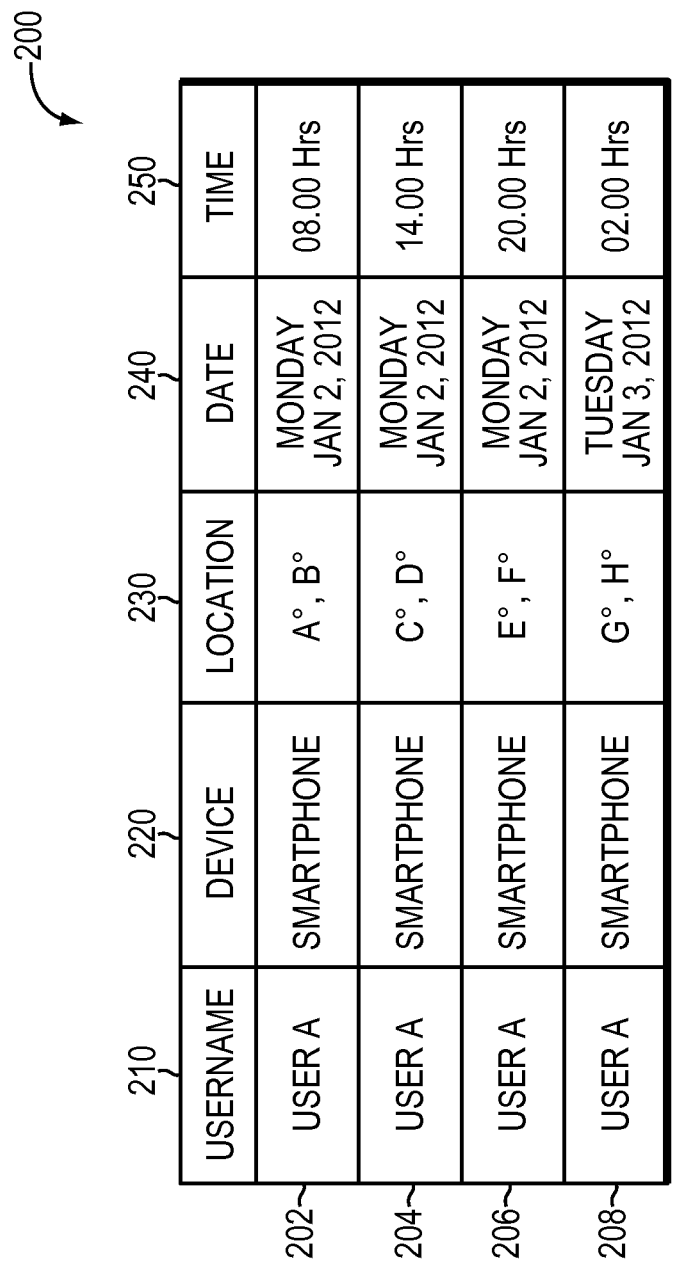
FIG. 4 is a diagram illustrating an example of a location history record in connection with an entity.

Referring to FIG. 4, there is illustrated an example of a location history record 200 in connection with the user 32. For example, the location history record may be similar to that as stored in the database 26 in the adaptive authentication server 22. It will be understood that the location history record comprises multiple data entries (202, 204, 206, 208) in connection with the user 32. It will also be understood that each data entry comprises a username 210, a device identification 220, location information 230, date 240 and time 250. It will be further understood from the figure that the location history record 200 relates to a period starting 08.00 hours on Jan. 2, 2012 and finishing 02.00 hours on Jan. 3, 2012. However, this period is for illustration purposes only and there can be a plurality of data entries over a much longer period of time. Indeed, the time difference between the data entries in some embodiments may be substantially less than six hours. It will also be understood from the foregoing that the data can be collected by the smartphone 14b using the GPS and submitted to the authentication server 22 to be stored in the database 26. It will be further understood from the foregoing description that the location data in connection with the smartphone 14b is assumed to be substantially the same as the location of the user 32.

It can be seen from the figure that each data entry (202, 204, 206, 208) relates to User A and a smartphone 14b associated with User A. It can also be seen that the smartphone 14b was located at co-ordinates A° B° (longitude, latitude) on Monday Jan. 2, 2012 at 08.00 hours. It can also be seen that the smartphone 14b was located at co-ordinates C° D° (longitude, latitude) on Monday Jan. 2, 2012 at 14.00 hours. It can also be seen that the smartphone 14b was located at co-ordinates E° F° (longitude, latitude) on Monday Jan. 2, 2012 at 20.00 hours. It can also be seen that the smartphone 14b was located at co-ordinates G° H° (longitude, latitude) on Tuesday Jan. 3, 2012 at 02.00 hours.

It will be appreciated as disclosed previously that the locations in connection with the smartphone 14b are assumed to emulate the locations of the user 32. It will also be understood that the location history may have a certain pattern. For example, the co-ordinates A° B° at 08.00 hours may correspond to a location on the user's route to work each week day. Additionally, the co-ordinates C° D° at 14.00 hours may correspond to a location at work. Furthermore, the co-ordinates E° F° at 20.00 hrs may correspond to a location that the user uses for taking a walk each evening. Moreover, the co-ordinates G° H° at 02.00 hours may correspond to the location of the user's home.

Figure 5:
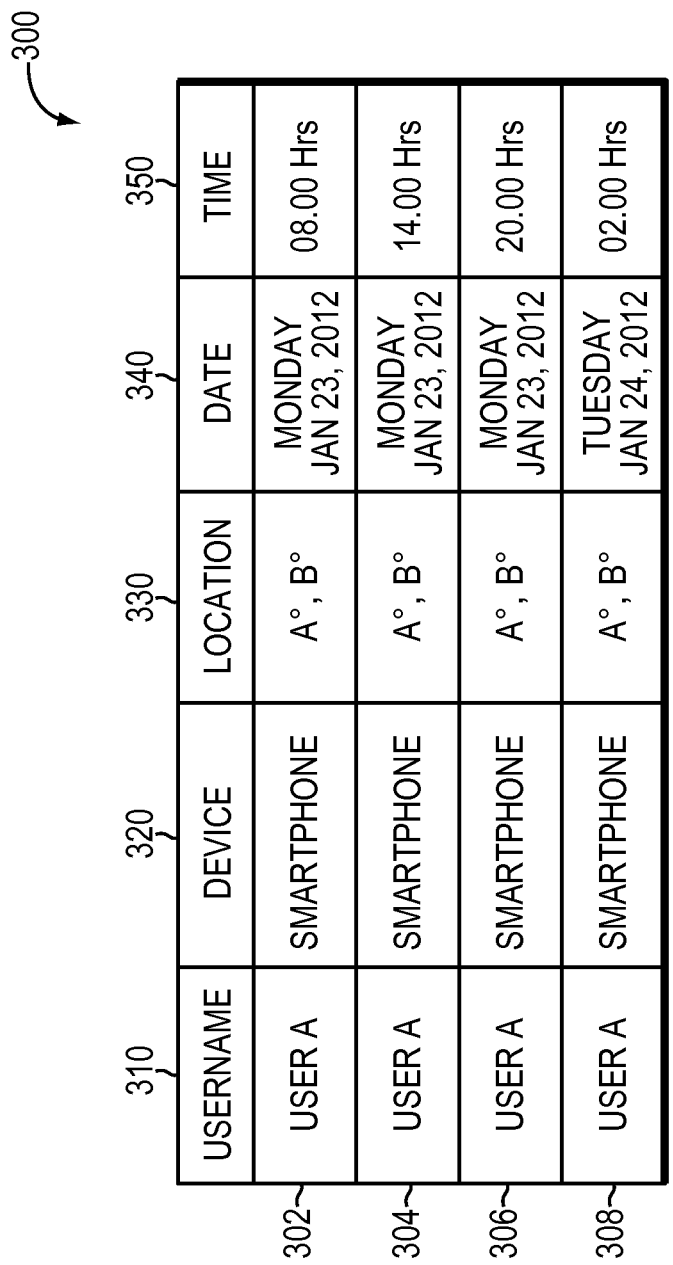
FIG. 5 is a diagram illustrating an example of a record of recent locations in connection with an entity.

Referring to FIG. 5, there is illustrated an example of a record of recent locations 300 in connection the user 32. It will be appreciated that the record may be stored in the database 26 in the adaptive authentication server 22. It will be further appreciated that the smartphone 14b may periodically submit the locations using the GPS. It will be still further appreciated that machine learning techniques or data mining techniques associated with the server 22 may detect a pattern of irregular behavior in connection with the recent locations of the user 32 as stored in the database 26.

The record of recent locations 300 as illustrated in the figure comprises multiple data entries (302, 304, 306, 308) in connection with the user 32. It will be understood that each data entry comprises a username 310, a device identification 320, location information 330, date 340 and time 350. It will be seen from the figure that the data entries are similar to the entries in the location history record 200. The difference being that the record 300 of recent locations relates to a period starting 08.00 hours on Jan. 23, 2012 and finishing 02.00 hours on Jan. 23, 2012. Furthermore, it can also be seen that the smartphone 14b was located at co-ordinates A° B° (longitude, latitude) for the period between Monday Jan. 23, 2012 at 08.00 hours and Tuesday Jan. 24, 2012 at 02.00 hours.

It will be appreciated from the location history 200 that the co-ordinates A° B° historically corresponds to a location on the user's route to work each week day. If the smartphone 14b is located at this location for a lengthy period of time then an irregular pattern will be detected. Accordingly, if an authentication request is submitted on January 24, the result of the analysis will likely establish a high risk in connection with the authentication request as it is most unusual for the smartphone 14b to be located at A° B° for any prolonged period of time as illustrated by the location history record 200.

It will be appreciated that in some embodiments the adaptive authentication server may be configured to further challenge the user. For example, if the analysis establishes a high risk the user can be challenged with a question.

Moreover, it will be appreciated that the adaptive authentication server may be configured to include a user profile which may be combined or form part of location history in connection with the communications device. For example, if the user has never left the U.S.A., the aforementioned travel detail with respect to the user will be included in the user profile meaning that if the pattern of recent locations includes a geo-location for Europe the risk engine will be configured to generate a much higher risk score.

Furthermore, the adaptive authentication server may be configured for recognizing that certain locations are of a greater threat. For example, it will be appreciated that certain areas within a metropolitan area tend to be of greater threat than others. In addition, it will be appreciated that certain countries or areas within a metropolitan area may be transiently subject to additional risk factors. For example, a temporary influx of people may be expected in an area due to a large sporting event, concert or the like. The risk engine may be configured to take this into account when generating a risk score.

While the above technique describes that an enrollment type process may be performed in order to store the historical location data in the database 26 of the adaptive authentication server 22, it will be understood further records of discrete recorded locations visited by the communications device may be captured and the location history in the database may be periodically updated in response to capturing further records.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method comprising:
   at an authentication system comprising one or more processors and memory coupled to the one or more processors, wherein the memory is constructed and arranged to store instructions executable by the one or more processors, wherein the one or more processors executing instructions from the memory forms a specialized circuit:
   receiving an online request to authenticate an entity;
   storing a location history comprising a historical record of locations visited by a mobile communications device associated with the entity over a first period of time;
   receiving location information comprising a record of locations visited by the the mobile communications device over a second period of time;
   based on the location information, detecting a pattern of locations, wherein the pattern indicates that the mobile communications device is located at the same location for the second period of time;
   determining that the pattern represents a sequence of locations over a timeline that indicates irregular behavior with respect to the location history, wherein the location history indicates that the entity has historically a regular travel pattern that does not include the mobile communications device being located in same location for a period of time that is similar to the second period of time; and
   based on said determination, determining a risk score for use in authenticating the entity.

2. The method as claimed in claim 1, wherein the pattern is detected using data mining techniques.

3. The method as claimed in claim 1, wherein the pattern is detected using machine learning techniques.

4. The method as claimed in claim 1, wherein the location history comprises multiple records with each record including an identity of the entity, a location of the entity and a timestamp.

5. The method as claimed in claim 1, further comprising:
granting access to a computerized resource in response to the risk score exceeding a predefined threshold; and
denying access to the computerized resource in response to the risk score not exceeding the predefined threshold.

6. A system, comprising:
one or more processors and memory coupled to the one or more processors, wherein the memory is constructed and arranged to store instructions which, when executed by the one or more processors, cause the one or more processors to perform operations comprising:
receiving an online request to authenticate an entity;
storing a location history comprising a historical record of locations visited by a mobile communications device associated with the entity over a first period of time;
receiving location information comprising a record of locations visited by the mobile communications device over a second period of time;
based on the location information, detecting a pattern of locations, wherein the pattern indicates that the mobile communications device is located at the same location for the second period of time;
determining that the pattern represents a sequence of locations over a timeline that indicates irregular behavior with respect to the location history, wherein the location history indicates that the entity has historically a regular travel pattern that does not include the mobile communications device being located in same location for a period of time that is similar to the second period of time; and
based on said determination, determining a risk score for use in authenticating the entity.

7. The system as claimed in claim 6, wherein the pattern is detected using data mining techniques.

8. The system as claimed in claim 6, wherein the pattern is detected using machine learning techniques.

9. The system as claimed in claim 6, wherein the location history comprises multiple records with each record including an identity of the entity, a location of the entity and a timestamp.

10. The system as claimed in claim 6, further performing operations comprising:
granting access to a computerized resource in response to the risk score exceeding a predefined threshold; and
denying access to the computerized resource in response to the risk score not exceeding the predefined threshold.

* * * * *